Aug. 17, 1943.  B. SHMURAK  2,326,805
WELDING APPARATUS
Filed Nov. 28, 1941  2 Sheets-Sheet 1
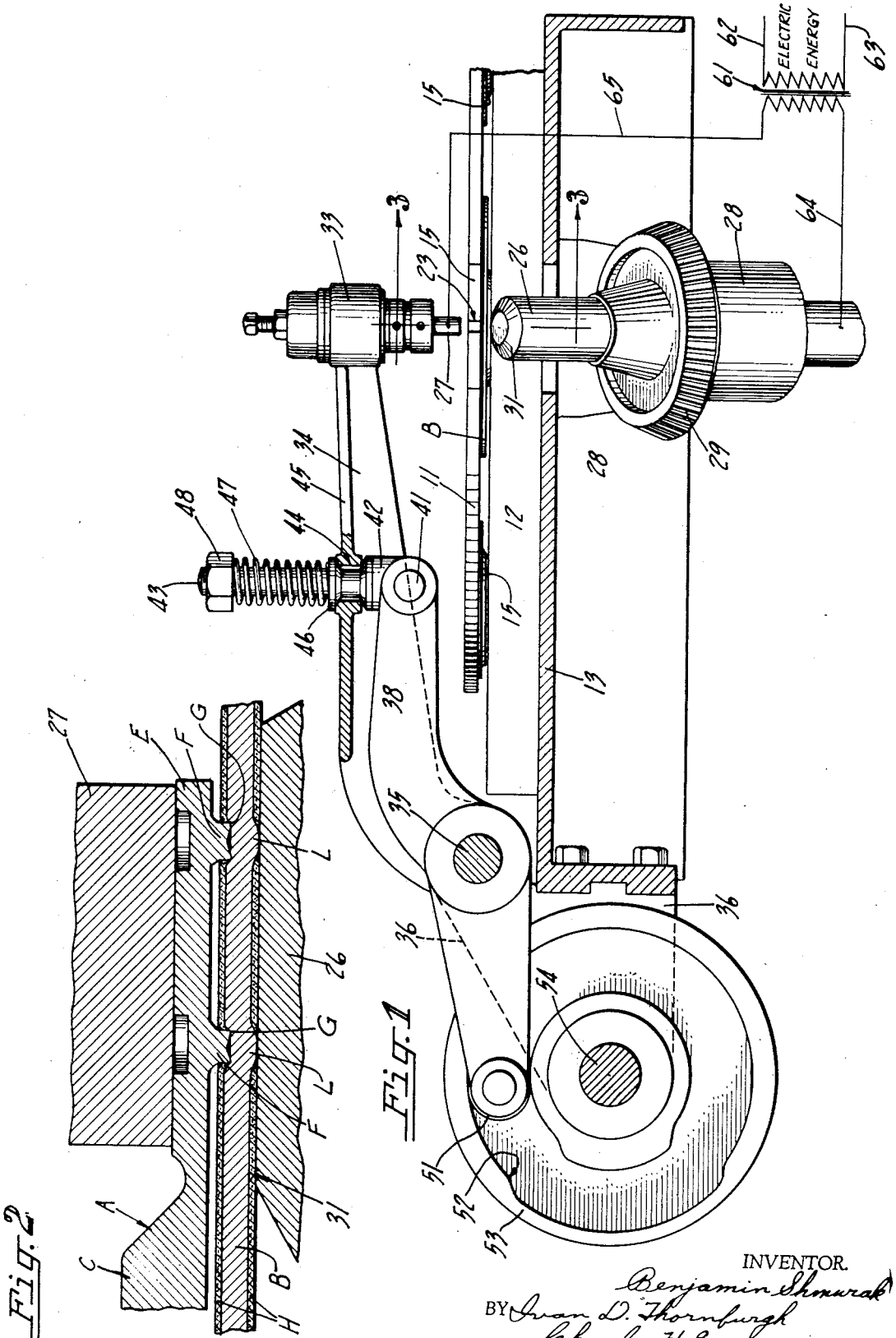

Aug. 17, 1943.   B. SHMURAK   2,326,805
WELDING APPARATUS
Filed Nov. 28, 1941   2 Sheets-Sheet 2
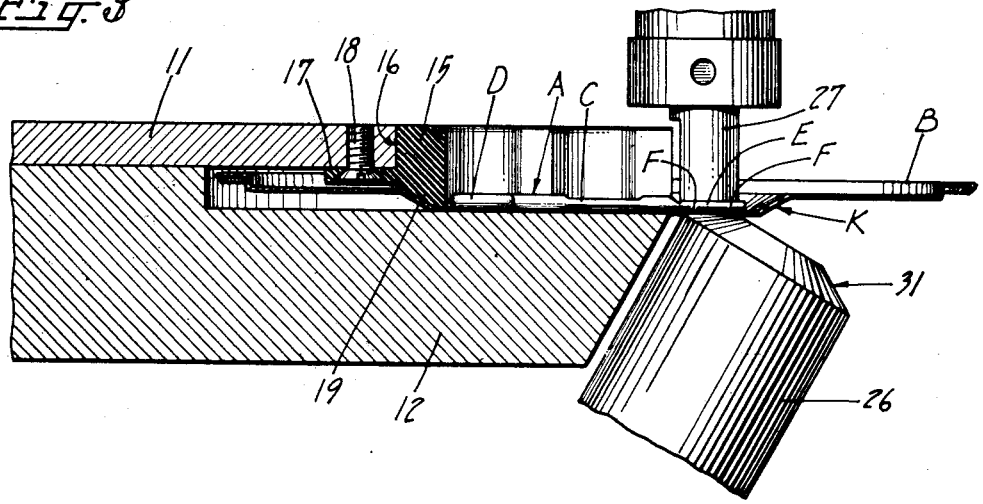
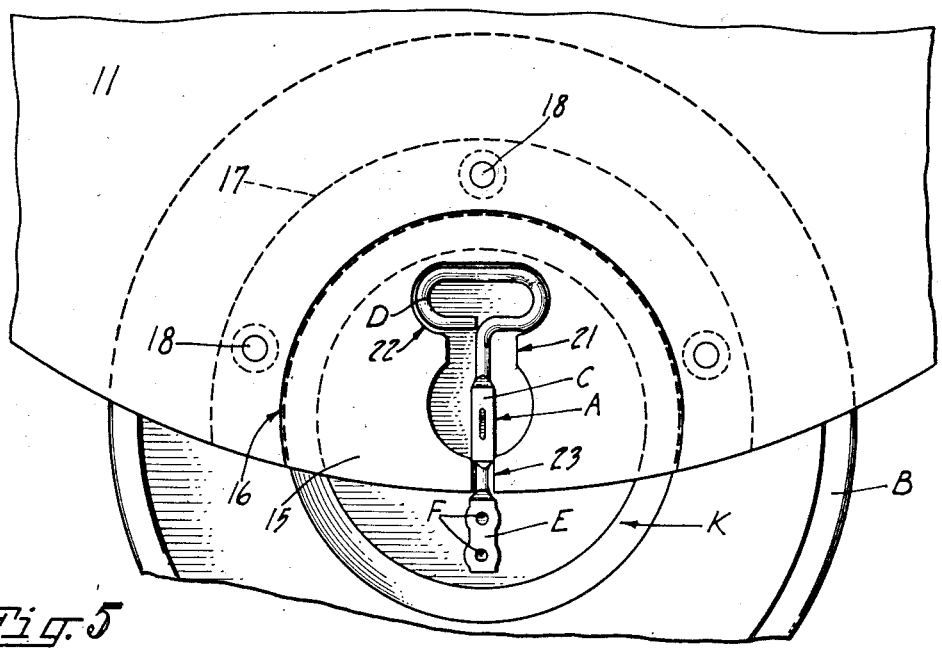
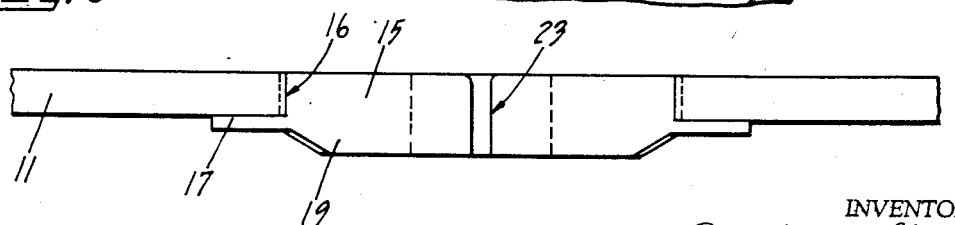

Patented Aug. 17, 1943

2,326,805

UNITED STATES PATENT OFFICE 2,326,805

WELDING APPARATUS

Benjamin Shmurak, New York, N. Y., assignor to American Can Company, New York, N. Y., a corporation of New Jersey Application November 28, 1941, Serial No. 420,887

4 Claims. (Cl. 219—4)

The present invention relates to an apparatus for welding tearing strip keys to can ends and has particular reference to insulating the key from the apparatus during the welding operation when the key is to be attached to a can end having both side surfaces coated with a protective substance. My copending method application Serial No. 420,-888, filed concurrently herewith, is related to the present invention.

In the usual practice of welding keys to can ends, the assembled key and can end are positioned between electrodes and a high amperage welding current is passed through the key and the can end, and a part of the metal thereof within the path of the current is thereby fused to form the welding bond. When welding keys to can ends which are surface coated on both sides, it has been found necessary for best results, to insulate the key from the apparatus to prevent by-passing or shunting of the welding current around the can end and to insure that the key is permanently secured to the can end.

An object therefore of the invention is the provision in an apparatus for welding keys to can ends of devices for insulating the key from the welding apparatus wherein the electric current utilized for effecting the welding bond between the key and the can end is prevented from being by-passed around the can end so that a better welding connection is made and a permanent attachment of the key to the can end is insured.

Numerous other objects and advantages of the invention will be apparent as it is better understood from the following description, which, taken in connection with the accompanying drawings, discloses a preferred embodiment thereof.

Referring to the drawings:

Figure 1 is a sectional view taken through a welding apparatus embodying the instant invention, with parts broken away, the view also showing a wiring diagram of the electric devices used in the apparatus;

Fig. 2 is an enlarged sectional view of a key being welded to a can end by the apparatus shown in Fig. 1, with parts broken away;

Fig. 3 is an enlarged sectional view taken substantially along the line 3—3 in Fig. 1, with parts broken away, the view showing a key and a can end in welding position in the apparatus;

Fig. 4 is a top plan view of the parts shown in Fig. 3 including the key and the can end, the view being turned through an angle of ninety degrees, with parts broken away; and Fig. 5 is a side elevation of the turret which holds the key and the can end for welding.

As a preferred embodiment of the instant invention, the drawings illustrate principal welding parts of a key and can end welding machine of the character disclosed in United States Patent 1,635,536, issued July 12, 1927, to W. F. Butler, on Machine for fastening keys to can covers. In such a machine wire keys A (Fig. 4) are fed from a stack of such keys and are arranged onto can ends B and in this assembled relation are positioned between a pair of cooperating electrodes for the welding operation.

In the instant invention the keys A are formed each with a long shank C having at one end a loop head or handle D while its opposite end is formed with a flattened tail extension E which is the part of the key to be permanently secured to the can end. The tail end E of the key is formed with a pair of inverted conical projections F having cylindrical apexes terminating in rough, raw surfaces constituting sharp teeth G (see Fig. 2). These teeth are utilized to facilitate attachment of the key to the can end B as will be hereinafter explained.

The can end B here shown by way of example, is circular in shape and is formed with a central countersunk panel K although the invention is equally well adapted to can ends of any other shape. The can end is surface coated on both sides preferably with a protective lacquer or enamel, indicated by the letter H in Fig. 2.

A key A and a can end B to be welded together are carried in a rotatable disc turret 11 which is mounted in and constitutes a part of the machine and this turret is rotated intermittently preferably in the manner disclosed in the above mentioned Butler patent. The can end is supported on and slides along a stationary table 12 which is disposed below the turret 11 and which is secured to a frame 13. This frame constitutes the main frame of the machine. The can end is located between the bottom of the turret and the top of the table and is propelled by an insert block 15 (Figs. 3, 4 and 5) which fits into a circular recess 16 in the turret.

The insert block 15 is formed with a flange 17 which is secured by screws 18 to the turret. The bottom of the insert block is formed with an inverted frusto-conical, depending panel section 19 which fits within the countersunk panel K of the can end, thus holding the latter from displacement relative to the turret.

The insert block 15 is formed further with an irregularly shaped slot 21 for carrying the key A in a predetermined position on the confined can end B. This slot is formed with an oblong head section 22 for the loop D of the key and a straight narrow section 23 for the shank C. It is these slot sections which locate and retain the key in a predetermined position on the can end.

The key and the can end are located in the turret 11 in a manner which permits of the flat tail section E of the key and the corresponding portion of the can end to which the key is to be attached, to overhang or extend beyond the outer edge of the turret, as shown in Fig. 4. This positions the parts for the welding operation. The insert block 15 or a portion thereof immediately adjacent the key, is made preferably of a suitable insulating material. This insures that the key is totally insulated from the turret 11. Being insulated from the turret, the key in like manner will be insulated from the remaining parts of the machine with the exception of the electrodes.

With the key A and the can end B thus held in a predetermined relation in the turret 11, the latter carries them around a circular path of travel to a welding station (Figs. 1 and 3). At this station there is located a lower welding electrode 26 and an upper electrode 27 and the assembled key and can end are presented between the electrodes.

The lower electrode 26 is disposed at an angle to the path of travel of the assembled key and can end and is rotatably carried in a bearing bracket 28 which is bolted to the machine frame 13. A bevel gear 29 may be an integral part of the electrode and periodically is rotated by any suitable means whereby the electrode turns slightly after each welding operation. The upper end of the electrode is formed with a beveled face 31 which contacts the bottom of the positioned can end, as best shown in Figs. 2 and 3.

The upper electrode 27 is carried in a head 33 (Fig. 1) formed on an arm 34 loosely mounted on a shaft 35 carried in a bearing bracket 36 bolted to the machine frame 13. The arm 34 is connected in a yieldable manner to a cam actuated lever 38, which is mounted on the shaft 35.

For this latter purpose the inner end of the lever carries a pivot pin 41 on which is mounted a swivel 42 having a long stem 43 which extends up through an aperture 44 in an overhanging flange 45 formed on the arm 34. Above the flange of the arm, the stem carries a washer 46 and a compression spring 47 held in place by a locknut 48 which is threaded onto the upper end of the stem. By adjusting the nut the pressure of the spring on the arm may be regulated.

The outer end of the lever 38 carries a cam roller 51 which operates in a cam groove 52 of a face cam 53 mounted on a rotatable shaft 54 journaled in the bearing bracket 36. The shaft is rotated in any suitable manner in time with the other moving parts of the machine.

The normal position of the upper electrode 27 is in raised spaced relation to the lower electrode 26, as shown in Fig. 1. Hence as the cam 53 rotates, it rocks the lever 38 at the proper time and this lever pulls down on the arm 34 through its spring connection with the lever. This action pulls the upper electrode 27 down with some pressure on top of the assembled key A and the can end B for the welding operation.

Electric energy for the welding operation is effective through a transformer 61, the primary side of which is connected by wires 62, 63 which lead from any suitable source of supply of electric energy. The secondary side of the transformer is connected by wires 64, 65 to the lower electrode 26 and to the upper electrode 27, respectively.

When the upper electrode 27 moves downwardly under its actuated pressure against the assembled key A and forces it against the can end B positioned on the lower electrode 26, it presses the sharp teeth G of the projections F on the key into and through the lacquer H on the can end and into the metal of the end, as best shown in Fig. 2. At the same time this piercing of the upper lacquer coating on the can end by the teeth G is accompanied by indenture or extrusion of that part of the can end which is directly beneath the teeth which results in the formation of knobs or bosses L which project beyond the lower surface of the can end. During the forming of these bosses the can end is backed-up by the lower electrode 26 and the pressure exerted on the lower coated surface of the can end by the electrodes squeezes out or displaces the lacquer from the faces of the bosses.

In this manner a metal to metal contact is made between the key and the metal of the can end and since the key is entirely insulated from the turret to prevent shunting of the welding current through the turret, a direct path of travel of the current is set up through the key and through the can end in passage of the current from one electrode to the other. This direct transmission of the current through the key and the can end fuses the metal of key and end at the point of contact and thus permanently welds the key to the end.

After such a welding operation, the upper electrode is lifted by the cam 53 to its normal raised position, thus serving to break the welding circuit. The turret 11 then rotates to carry the welded key and cover to a suitable place of deposit. This completes the operation of the machine of the present invention, thereby completing attachment of the key to the can end.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for attaching opening keys having sharp welding projections thereon to can ends having a protective surface coating substance on both sides thereof, the combination of a pair of welding electrodes for engaging an assembled key and can end placed between them, means for pressing one of the electrodes against the assembled key and can end to force the sharp projections of the key through the protective coating on the adjacent side of the can end and squeezing out the protective coating on the opposite side to produce a metal to metal contact between the two surfaces of the can end and the key and the other electrode, and an insulated member for holding the key in its assembled position on said can end, whereby welding current during the welding operation passes directly from one electrode to the other through the oppositely disposed can end surfaces from which the coating has been removed by the squeezing action, whereby to fuse the interposed key and can end together in a permanent welded bond.

2. In an apparatus for attaching opening keys to can ends having a protective coating substance on both sides thereof, the combination of a pair of welding electrodes for engaging an assembled key and can end placed between them, a rotatable turret for bringing the assembled key and can end into position between the electrodes, and an insulated insert block in said turret having a pocket in which the key is disposed and in which it is insulated from the turret to insure direct passage of a welding current from said electrodes through the key and can end to fuse them together in a permanent welded bond while preventing shunting of the current through the key and the turret.

3. In an apparatus for attaching opening keys having sharp welding projections thereon to can ends having a protective surface coating substance on both sides thereof, the combination of a pair of welding electrodes for engaging an assembled key and can end placed between them, means for pressing one of the electrodes against the assembled key and can end to force the sharp projections on the key through the protective coating on the adjacent side of the can end thereby producing a metal to metal contact therebetween while extruding a boss on the other side of the can end which extends through and displaces the coating from the boss thereby producing a metal to metal contact between the surface of the boss and the other electrode, a rotatable turret for bringing the assembled key and can end into position between said electrodes, and an insulating insert block in said turret having a pocket for the key and engaging the can end to insulate key and can end from the turret to insure direct passage of a welding current through the key and the end whereby to fuse them together in a permanent welded bond while preventing shunting of the current from the can end.

4. In an apparatus for electrically welding a metal opening key having a sharp welding projection thereon to a metal can end when said metal end is surface coated on the key engaging side with an insulating material such as lacquer, the combination of a pair of welding electrodes for engaging an assembled key and can end brought between them, means for bringing the assembled key and can end into position between the electrodes, means for pressing the assembled key and can end together between said electrodes to force said key projection through the surface coating of said end, and insulating means for confining the welding current to a direct path between said electrodes and the welding point, whereby to fuse the interposed key and can end together in a permanent welded bond.

BENJAMIN SHMURAK.